United States Patent [19]

Johnson, IV

[11] 4,019,298

[45] Apr. 26, 1977

[54] BEAM SUSPENSION SYSTEM

[76] Inventor: John J. Johnson, IV, 212 Dartmouth, NE., Albuquerque, N. Mex. 87106

[22] Filed: Nov. 4, 1974

[21] Appl. No.: 520,478

Related U.S. Application Data

[63] Continuation-in-part of Ser. No. 380,147, July 18, 1973, abandoned.

[52] U.S. Cl. .................................. 52/594; 403/49; 403/175; 403/331; 403/381
[51] Int. Cl.² ...................... E04C 1/10; E04B 1/56; F16B 12/58
[58] Field of Search ............ 403/49, 175, 381, 331; 29/150; 52/122, 660, 594, 646; 182/178, 179; 5/300

[56] References Cited

UNITED STATES PATENTS

| | | | |
|---|---|---|---|
| 616,131 | 12/1898 | McAfee | 5/300 |
| 748,036 | 12/1903 | Argubright et al. | 5/287 |
| 918,699 | 4/1909 | Ransome | 52/283 |
| 1,133,513 | 3/1915 | Thompson | 403/331 |
| 1,303,090 | 5/1919 | McCray | 403/331 |
| 1,918,116 | 7/1933 | Mansfield | 182/187 |
| 1,986,465 | 1/1935 | Dempsey | 403/381 |
| 2,580,174 | 12/1951 | Henderson | 52/594 |
| 2,793,407 | 5/1957 | Johnston | 403/345 |

FOREIGN PATENTS OR APPLICATIONS

| | | | |
|---|---|---|---|
| 1,287,204 | 1/1962 | France | 52/646 |
| 9,885 | 9/1901 | Norway | 5/300 |
| 3,677 | 4/1813 | United Kingdom | 5/300 |
| 11,858 | 5/1827 | United Kingdom | 287/103 R |
| 528 | 3/1854 | United Kingdom | 5/300 |
| 700,325 | 6/1951 | United Kingdom | 52/568 |

*Primary Examiner*—James L. Ridgill, Jr.
*Attorney, Agent, or Firm*—Cahill, Sutton & Thomas

[57] ABSTRACT

A dual tapered dovetail shaped mortise is formed within a joist to receive a dual tapered dovetail shaped tenon extending from a beam. Laterally oriented cavities are disposed within opposite faces of the mortise to receive correspondingly configured ridges formed integral with the mating tenon. The resulting frictional interlock between the mortise and the tenon created by two forces acting in opposition to one another rigidly secures the beam to the joist without play therebetween. The ridges, mating with the corresponding cavities, affords use of the resulting joint in any plane from horizontal to vertical without danger of separation.

2 Claims, 11 Drawing Figures

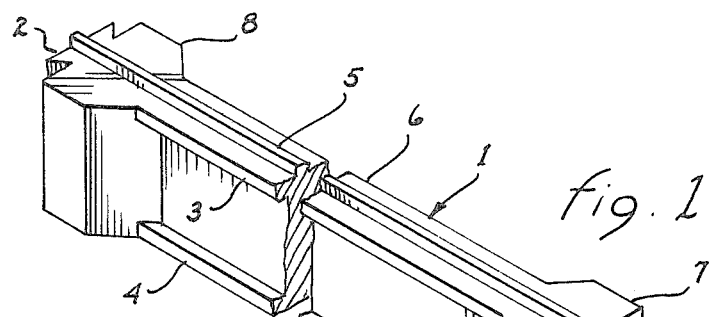
fig. 1
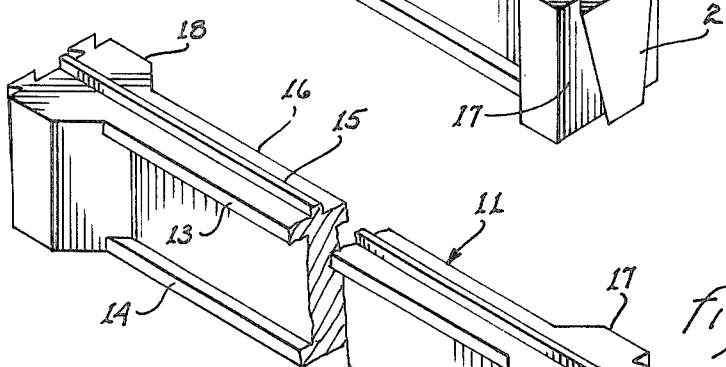
fig. 2
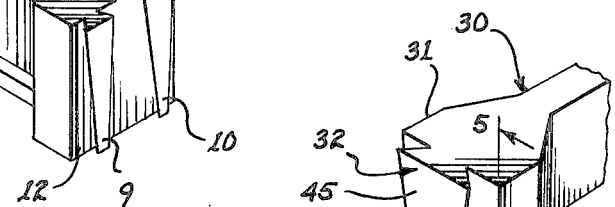
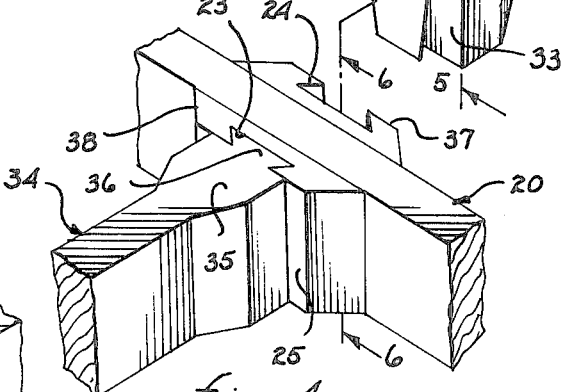
fig. 4
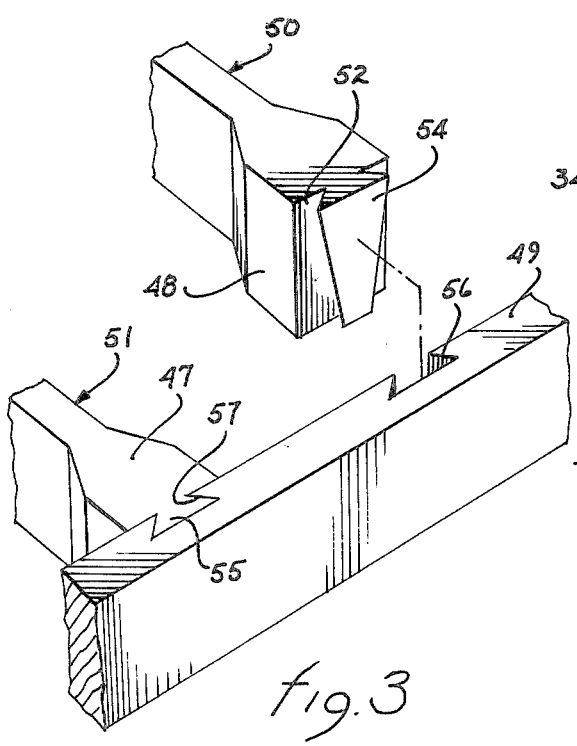
fig. 3
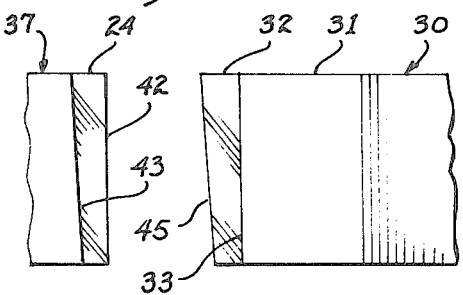
fig. 6  fig. 5

BEAM SUSPENSION SYSTEM

This application is a continuation-in-part of my application entitled "BEAM SUSPENSION SYSTEM", filed on July 18, 1973, and assigned Ser. No. 380,147, now abandoned.

The present invention relates to beam suspension systems, and more particularly, to apparatus for joining beams to joists.

Presently, rapidly built recreation homes, chalets and the like are sold in kit form for erection by the owner. Most of these dwellings employ standard, well known techniques for joining the floor and ceiling beams to the joists. The techniques employed, through adequate for the purposes intended in terms of strength and durability, are time consuming and require a certain degree of skill.

In order to eliminate, or at least reduce the level of skill in installing beams, several jig-like mechanisms have been developed. These mechanisms, disposed intermediate the joist and beam, adequately serve their purpose, but entail additional costs of manufacture and installation time.

One type of well known joint, not requiring any intermediate member is known as a dovetail joint. It may be defined as a male member tapered in a single plane and mating with a similarly tapered female member. The single plane taper provides compressional and frictional engagement in only one plane with a resulting limited rigidity. The dovetail joints have been employed primarily as self-aligning mechanisms in low stress environments. Where they have been used as the means for joining two structural elements to one another within a building member, the result sought was that of alignment rather than that of obtaining a load bearing joint. Such limited use was predicated upon the dovetail joint being tapered in a single plane.

Further examples of the prior art use of dovetail joints may be found in U.S. Pat. Nos. 3,090,086, directed to the cabinet making art; 3,683,429, illustrating cross frame members secured to the side-frame members of a bed frame; 2,793,407, teaching the use of dovetail joints in furniture; and 2,392,551, 3,148,477, 3,396,499, 3,410,044, 3,562,988, and 3,664,011, disclosing the aligning of structural members by means of dovetail joints. It may be noted that where load supporting frame members are connected to one another by dovetail joints, the frame members are horizontally oriented.

It is therefore a primary object of the present invention to provide a suspension system for securing beams to joists.

Another object of the present invention is to provide a means for securing beams to joists along a horizontal plane, a vertical plane or any intermediate plane.

A yet another object of the present invention is to provide a means for securing beams to joists without non-integral connecting apparatus.

Still another object of the present invention is to provide beams having dual tapered tenons formed at the ends thereof and integral therewith for mating with corresponding dual tapered mortises in joists.

A further object of the present invention is to provide a dual tapered tenon having an outwardly extended ridge aligned orthogonal to the axis of the tenon at the end of a beam and a dual tapered mortise having a for receiving the ridge disposed within a mating joist.

A still further object of the present invention is to provide a dual taper dovetail joint to interlock structural members with one another.

A yet further object of the present invention is to provide a dual taper dovetail joint having a further interlocking mechanism, all of which are formed integral within each of two connectible structural members.

These and other objects of present invention will become apparent to those skilled in the art as the description thereof proceeds.

The present invention may be described with greater clarity and specificity with reference to the following drawings, in which:

FIG. 1 illustrates a structural beam having a dual tapered mortise formed at either end.

FIG. 2 illustrates a structural member having a pair of dual tapered mortises disposed at either end.

FIG. 3 illustrates the means for incorporating the present invention to secure a plurality of beams to a joist.

FIG. 4 illustrates the use of the present invention in securing a pair of beams to the opposite sides of a joist.

FIG. 5 is a cross-side view of the tenon formed integral with the end of a beam, taken along lines 5—5 as shown in FIG. 4.

FIG. 6 is a cross-sectional view of the mortise disposed in a joist, taken along lines 6—6 as shown in FIG. 4.

Figure 7:
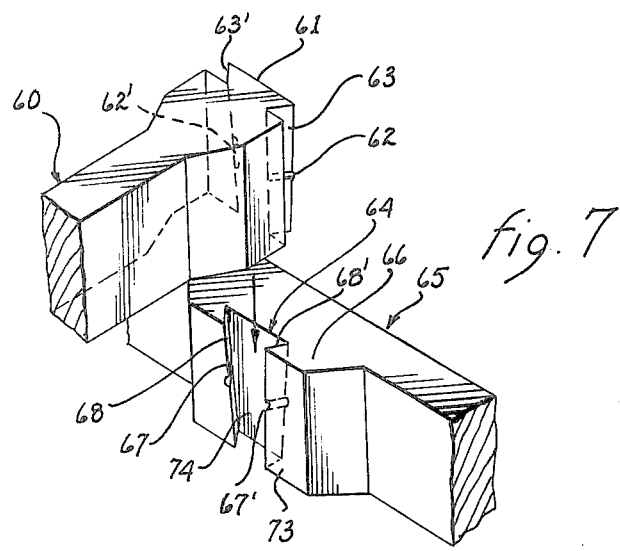
FIG. 7 illustrates a dual tapered tenon for engagement with a dual tapered mortise and including interlocking elements aligned normal to the axes of the planes defining the dual taper.

Referring to FIG. 1, there is shown a beam 1 having a dual tapered tenon 2 extending from each end thereof. These tenons interlock similarly configured mortises disposed within abutting structural members. To reduce the mass of beam 1 without sacrificing its structural strength, the beam may be formed with a plurality of longitudinal ridges 3, 4, 5 and 6.

The ends 7 and 8 of beam 1 are of larger cross-sectional area than the remainder of the beams. The larger ends permit a wide and robust tenon to extend therefrom. Surface 17 at the extremity of end 7 is generally equivalent to the cross-sectional area of end 7. It may be planar, or otherwise configured to mate with the surface of an abutting structural member.

As shown, beam 1 is intended to be a monolithic unit so that it may be formed by simple manufacturing processes to minimize production and installation costs. It is contemplated that beam 1 may be made of wood, one of the many available plastics or fiberglass, metallic material. When beam 1 is manufactured as a monolithic unit no further elements need be added to locate and secure it within the structure being built.

The beam 11 shown in FIG. 2 is similar to beam 1 in that it may be formed with a plurality of ridges 13, 14, 15 and 16 to provide structural integrity yet minimize the mass. Beam 11 may also include ends 17 and 18 of greater cross-sectional area than that of the central part of beam 11. Surface 12, at the extremity of end 17, may be planar or otherwise curved or angled to conform with the surface of the structural member which will abut end 17. A pair of dual tapered tenons 9 and 10 are formed as a part of beam 11 and extend outwardly from surface 12. By employing a pair of tenons rather than a single one (as shown in FIG. 1), the lateral surface area of the tenons may be greatly increased to effect a better interlock between the tenons and the mating mortises. As with beam 1, beam 11 may be formed as a monolithic unit from any one of many available materials.

FIG. 3 illustrates the manner of attaching several beams to a joist. The end 48 of beam 50 is enlarged with respect to the central part of the beam to provide structural strength at the junction of the beam and adjoining joist 49. A dull tapered tenon 54 extends outwardly from surface 52, which surface defines the extremity of end 48. Similarly, beam 51 includes an end 47 having a dual tapered tenon 55 extending therefrom. A plurality of dual tapered mortises 56 and 57 are disposed within the joist 49 to receive dual tapered tenons 54 and 55, respectively.

The beam/joist structure may be assembled by simply sliding the tenon of each beam downwardly to frictionally engage the corresponding mortise. The dual taper of the tenon and mating mortise will tend to compress the tenon in two directions, which directions are normal to one another. The surface at the end of each beam is positioned adjacent the surface of the joist and is drawn theretoward by the locking action of the tenon within the mortise. The extended width and height of the surface at the end of a beam tends to inhibit any pivoting action of the beam without the tenon/mortise joist. Thereby, the rigidity of the tenon/mortise joist is enhanced by the stabilizing effect of the end of the beam abutting the joist.

FIGS. 4, 5 and 6 illustrate the manner in which the present invention may be incorporated in existing structures wherein the joists are already in place; or, where the width of a joist is insufficient to permit the forming of one or more mortises therein without sacrificing necessary structural strength. The figures further illustrate the means by which a joist may be disposed intermediate two longitudinally aligned beams.

An existing or narrow width joist 20 is modified by securing a built up section 37 at one side thereof. The section may be adhesively or mechanically secured to the joist 20. A dual tapered mortise 24 is formed within section 37 to receive and frictionally lock a dual tapered tenon therein. Beam 30 includes an end 31 of greater cross-sectional area than the central part of the beam. A dual tapered tenon 32 extends outwardly from surface 33, which surface defines the extremity of end 31.

Similarly, another built up section 38 is attached to the opposite side of joist 20 and includes a dual tapered mortise 23 disposed therein. A beam 34, connected to mortise 23, includes an enlarged end 35 having a dual tapered tenon 36 extending therefrom. The dual tapered tenon 36 is disposed within mortise 23 and locks beam 34 to joist 20. The surface defining the extremity of end 35, and from which dual tapered tenon 36 extends, is configured to mate with surface 25 of built up section 38. The locking action of the tenon/mortise joist tends to draw the end surface of the beam toward surface 25 to form a firm fit therebetween. The firm fit enhances the rigidity of the joist by tending to inhibit pivotal movement of the beam about the vertical axis through the joists.

The dual taper of tenon 32 is more distinctly illustrated in FIG. 5. Surface 33, defining the extremity of end 31, may be essentially perpendicular to the longitudinal axis of beam 30. The outer surface 45 of dual tapered tenon 32 is non-parallel to surface 33, whereby the thickness of the tenon diminishes in the downward direction. Thus, the tenon is tapered in two planes, which planes are normal to one another.

The dual taper of mortise 24 is illustrated in FIG. 6. Surface 42, defining the lateral extremity of built up section 37 is formed parallel to surface 33 of end 31 to permit them to mate with one another. The inner surface 43 is non-parallel to surface 42, whereby the width of the mortise diminishes in the downward direction. The taper of mortise 24 is equivalent to the taper of tenon 32 by forming surface 43 parallel to surface 45. Thus, the mortise 24 is tapered in two planes, which planes are normal to one another but in alignment with the equivalent planes of tenon 32.

The construction shown in FIG. 4 may be used where large span beams are needed. With this construction, it is possible to employ a central joist having other joists disposed on either side. The beams sould be laid intermediate each of the outer joists and the central joist to form the required extended beam.

If a plurality of beams and/or joists are to be joined to one another in close proximity to one another, the assembly process may dislodge a previously joined tenon and mortise. To prevent inadvertent disassembly, a lock pin may be driven into mating detents intermediate the assembled tenon and mortise to lock them in place and prevent dislodgement. The pin may be inserted as a temporary or permanent fixture.

From the above description, it may become apparent to those skilled in the art that the structural techniques taught is of real import to the building industry. By using the disclosed structure it is possible to lay the beams for the floor or ceiling by simply inserting the tenons of each of the beams within mortises disposed in the joists. A non-dismantleable installation can be effected by gluing or cementing the tenons within the mortise.

Referring to FIG. 7, there is shown an improvement of the above described structure. Beam 60, which beam may be configured of a variety of materials as described above, is formed with a dual tapered tenon 61 at the extremity thereof. It may be noted that the length of the tenon tapers downwardly in the vertical plane parallel to the axis of beam 60 and the width of the tenon tapers downwardly in the vertical plane normal to the axis of the beam. A ridge 62 extends outwardly from face 63 of tenon 61. The ridge lies in a horizontal plane, and hence normal to the two vertically oriented tapers of tenon 61. A similar ridge is disposed upon the opposite face (64') of tenon 61 (see FIG. 10).

A dual tapered mortise 64 is formed within a joist 65, or it may be disposed within a laterally extending built up section 66, as shown, to preserve the structural integrity of the joist. The depth of the mortise 64 tapers downwardly in the vertical plane normal to the axis of beam 60 and the width of the mortise tapers downwardly in the vertical plane parallel to the axis of the beam. The relative dimensions and degree of taper of mortise 64 are commensurate with those of tenon 61 to obtain a match and frictional interlock therebetween.

A cavity, or depression, 67 is disposed within face 68 of mortise 64. Depression 67 is horizontally aligned and hence normal to the vertically aligned dual tapers of mortise 64. The relative dimensions and position of depression 67 are commensurate with the dimensions and position of a corresponding ridge (62') extending from the mating face (63') of tenon 61. Thereby, when tenon 61 is driven home with mortise 64, the corresponding protruding ridge (62') of tenon 61 mates with depression 67 within mortise 64. A second depression 67', shown by dashed line, is disposed within face 68' of mortise 64 to mate with ridge 62 of tenon 61. Each pair of mated ridge and depression may be considered as detent means.

Figure 8:
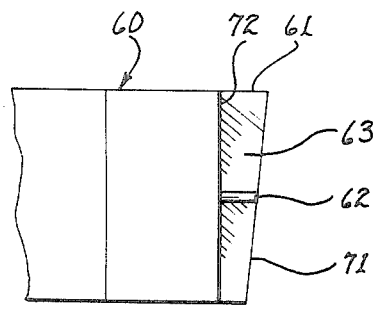
FIG. 8 is a side view of the dual tapered tenon shown in FIG. 7.
Figure 9:
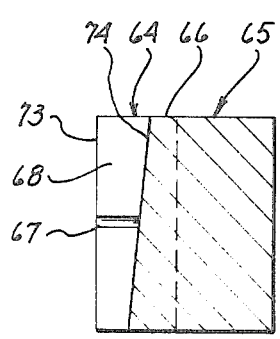
FIG. 9 is a side view of the dual tapered mortise shown in FIG. 7.

The interrelationships between the components illustrated within FIG. 7 will be described in further detail with reference to FIGS. 8 and 9. The end face 71 of tenon 61 slopes downwardly and toward beam 69 in order to establish one tapered surface of tenon 61. Ridges 62, 62', extending from faces 63, 63', respectively, of tenon 61 are disposed within the horizontal plane and essentially parallel to the axis of beam 60. The interior face 74 of mortise 64 is slanted at an angle equivalent to that of end face 71 of tenon 61 to establish one tapered surface of the mortise. Depressions 67, 67', disposed within faces 68, 68', respectively, are horizontally aligned and vertically positioned to mate with the corresponding ridges extending from tenon 61. The end face 72 of beam 60 is vertically aligned and slidably engages the vertical face 73 of built up section 66 (see also FIG. 7).

From the above discussion, it will be understood that when the tenon and mortise are mated with one another, face 72 of beam 60 will be adjacent face 73 of built up section 66; end face 71 of tenon 61 will be adjacent interior face 74 of mortise 64; and, the ridges extending lateral to tenon 61 will be mated with the corresponding depressions within mortise 64.

Figure 10:
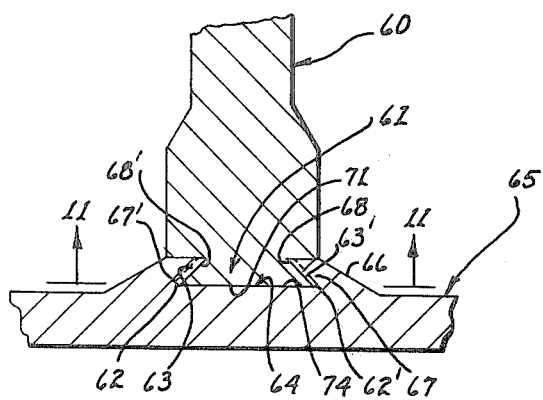
FIG. 10 is a top view of the joint shown in FIG. 9.
Figure 11:
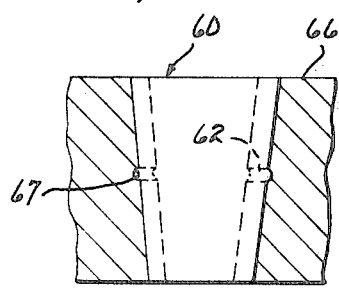
FIG. 11 is an end view taken along lines 11—11 as shown in FIG. 10.

The effect and significance of the dual tapers and the effect thereon by the ridges and mating depressions will be discussed with joint reference to FIGS. 10 and 11. As alluded to above, faces 63 and 63' of tenon 61 define the skirt of the dovetailed tenon and taper downwardly because of the downwardly decreasing depth and width of the tenon. Similarly, faces 68 and 68' of mortise 64 taper downwardly because of the downwardly decreasing depth and width of the mortise. These faces of the tenon and mortise are, per force, similarly slanted so as to mate and engage with one another.

End face 71 of tenon 61 sliding along interior face 74 of mortise 64, will tend to cause displacement of beam 60 away from joist 65. Because of the dovetail-like configuration of the tenon and mortise, the faces 68 and 68' of mortise 64 will frictionally engage faces 63 and 63' of tenon 61 and exert a resultant force upon beam 60 to displace it along its longitudinal axis toward joist 65. By maintaining an equal taper of both the width and depth of the tenon (and of the width and depth of the mortise), the opposing forces tending to cause longitudinal displacement of beam 60 will be equalized. This result has the further effect of increasing the frictional interlock between mating surfaces.

To aid in establishing structural rigidity between beam 60 and joist 65, and prevent horizontal or vertical pivotal movement therebetween, it is of paramount importance to ensure contact intermediate face 72 of beam 60 with face 73 of built up section 66.

From the above discussion, it will become appreciated that the dual tapered mortise and tenon will establish frictional interlock therebetween. The further addition of the mechanical interlocking elements, i.e. ridges and their mating depressions, will tend to prevent "working" of the joint with a resultant loss of frictional interlock. It will therefore be appreciated that not only can the above described joint be used in a horizontal plane as depicted in FIG. 7, but it may be used for vertically or otherwise non-horizontally oriented beams with equal ease and with little danger of separation between the tenon and the mortise.

The dimensions of ridges 62 and 62' are generally dependent upon the type and nature of material used for the beam and joist. In example, if the beams and/or joists are of plastic or other moldable hardenable material, the height of the ridges may be one to two millimeters; however, if the beam and joist are of metallic material such as aluminum or steel, the height of the ridges may be of one millimeter or less. The relatively slight height is functionally possible because the ridges and their associated depressions do not, in and of themselves, maintain the interlock intermediate the dual tapered tenon and the dual tapered mortise. Instead, the ridges and associated depressions serve to prevent working of the joint which working might, over a period of time, negatively affect the frictional interlock established by the tenon and mortise. That is, the dual tapered tenon and mortise establish and maintain the prime load bearing capabilities while the ridges and the associated depressions serve to restrict working of the joint during normal use.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A beam suspension structure securing a beam to a joint in a building structure, said suspension structure comprising in combination:
   a. a dual tapered dovetail mortise disposed within a planar side of the joist and extending downwardly from the top of the joist, said mortise including:
      i. an end surface depending downwardly from the top of the joist and sloping forwardly toward said side of the joist, said end surface being laterally terminated by lateral edges sloping downwardly toward one another at an acute angle and defining the sides of an inverted truncated isosceles triangle;
      ii. a pair of opposed lateral surfaces sloping downwardly toward one another and extending horizontally from said lateral edges of said end surface toward said side of the joist and toward one another, each said lateral surface being laterally terminated by a further lateral edge, said further lateral edges being sloped downwardly and toward one another at an acute angle within the plane of said side of the joist such that each said lateral surface defines an inverted truncated right triangle whereby a cross-section of said mortise defined by said end surface and said lateral surfaces and taken parallel to the top surface of the joist defines a trapezoid and resulting in said mortise being linearly tapered in both width and depth; and b. a dual tapered dovetail tenon extending from a planar end of the beam, said tenon including:
  i. a further end surface at the extremity of said tenon sloping downwardly and inwardly toward the beam at an angle equivalent to the sloping angle of said end surface of said mortise, said further end surface being laterally terminated by yet further lateral edges sloping downwardly toward one another at an acute angle and defining the sides of an inverted truncated isosceles triangle; and
  ii. a pair of further lateral surfaces sloping downwardly toward one another and extending horizontally from said further lateral edges of said further end surface toward said end of the beam and toward one another, each said further lateral surface being laterally terminated by still further lateral edges, said still further lateral edges being disposed in the plane of said end of the beam and sloping downwardly and toward one another at an acute angle such that each said further lateral surfaces defines an inverted truncated right triangle, whereby a cross-section of said tenon defined by said further end surface and said further pair of lateral surfaces and taken parallel to the longitudinal axis of the beam defines a trapezoid and resulting in said tenon being linearly tapered in both width and depth:
c. said tenon being mated with said mortise each of the surfaces defining said mortise interferingly contact corresponding surfaces of said tenon to establish force vectors perpendicular to each of the pairs of contacting surfaces to draw and retain said planar end of the beam adjacent said planar side of the joist and frictionally interlock said planar side of the joist and frictionally interlock said mortise and said tenon.

2. A structure as defined in claim 1 including
detent means for engaging said pair of opposed lateral surfaces with said pair of opposed further lateral surfaces and establishing a structural interlock therebetween; whereby, on mating of said mortise with said tenon the frictional interlock therebetween is augmented by the structural interlock,
said detent means comprises a depression disposed in each said lateral surfaces and a ridge disposed in each said further lateral surfaces for engaging the respective one of said depressions,
said depressions and said ridges lie within a plane parallel to a plane defined by the top of said joist.

* * * * *